(12) United States Patent
Bruck et al.

(10) Patent No.: US 9,114,481 B1
(45) Date of Patent: Aug. 25, 2015

(54) INERTIA FRICTION DISK WELDING

(71) Applicant: Siemens Energy, Inc., Orlando, FL (US)

(72) Inventors: Gerald J. Bruck, Oviedo, FL (US); Ahmed Kamel, Orlando, FL (US)

(73) Assignee: Siemens Energy, Inc, Orlando, FL (US)

( * ) Notice: Subject to any disclaimer, the term of this patent is extended or adjusted under 35 U.S.C. 154(b) by 3 days.

(21) Appl. No.: 14/185,997

(22) Filed: Feb. 21, 2014

(51) Int. Cl.
*B23K 20/12* (2006.01)
*B23K 28/02* (2014.01)

(52) U.S. Cl.
CPC ............ *B23K 20/1225* (2013.01); *B23K 20/12* (2013.01); *B23K 20/129* (2013.01); *B23K 28/02* (2013.01)

(58) Field of Classification Search
None
See application file for complete search history.

(56) References Cited

U.S. PATENT DOCUMENTS

| | | | |
|---|---|---|---|
| 4,030,658 A | 6/1977 | Parrish | |
| 6,253,987 B1 * | 7/2001 | Coletta et al. | 228/114.5 |
| 6,334,568 B1 * | 1/2002 | Seeds | 228/114.5 |
| 7,000,303 B2 * | 2/2006 | Talwar et al. | 29/402.01 |
| 7,841,834 B1 * | 11/2010 | Ryznic | 416/224 |
| 8,066,174 B2 * | 11/2011 | Bruck et al. | 228/112.1 |
| 8,715,435 B2 * | 5/2014 | Roberts et al. | 156/73.5 |
| 2003/0034379 A1 * | 2/2003 | Jackson et al. | 228/119 |
| 2003/0201306 A1 * | 10/2003 | McTernan et al. | 228/112.1 |
| 2004/0013521 A1 * | 1/2004 | Yamada | 415/216.1 |
| 2005/0011720 A1 * | 1/2005 | Adair et al. | 192/113.36 |
| 2005/0118330 A1 * | 6/2005 | Clark et al. | 427/140 |
| 2005/0173493 A1 * | 8/2005 | Workman et al. | 228/101 |
| 2007/0042310 A1 * | 2/2007 | Clark et al. | 432/77 |
| 2008/0216599 A1 * | 9/2008 | Murakami et al. | 74/594 |
| 2009/0139821 A1 * | 6/2009 | Koppitz et al. | 192/3.29 |
| 2009/0324986 A1 * | 12/2009 | Kleber | 428/591 |
| 2011/0062219 A1 * | 3/2011 | Bezaire et al. | 228/114 |
| 2012/0205014 A1 * | 8/2012 | Bruck et al. | 148/527 |
| 2014/0041223 A1 * | 2/2014 | Wojciechowski et al. | 29/889.1 |

FOREIGN PATENT DOCUMENTS

| | | | | |
|---|---|---|---|---|
| DE | 102011000544 A1 * | 9/2012 | | |
| EP | 2047945 A1 * | 4/2009 | | F01D 5/34 |
| JP | 2000-343246 A * | 12/2000 | | |
| JP | 2004338279 A * | 12/2004 | | B29C 65/06 |
| JP | 2006-035306 A * | 2/2006 | | |

* cited by examiner

*Primary Examiner* — Kiley Stoner

(57) ABSTRACT

A method of friction welding. A cutout (35) is formed in an edge (34) of a wall such as a turbine blade platform (24). The cutout has a concave surface of rotation of up to 180 degrees in angular extent that is open to the wall edge The circumference (40) of a rotating disk (36) of additive material is pressed into the cutout. Surface friction creates heat that fuses the disk into the surface of the cutout Scrap material is then trimmed flush with the wall surfaces. Two such processes may be performed on opposite edges (34A, 34B) of a wall, balancing the inward pressing forces (42A, 42B) of two disks. The disk may be rotary oscillated (56), such as plus and minus 5 degrees, thereby allowing a non-contacting part of the disk circumference to be eliminated Thin walls may be supported by incompressible fugitive material (70).

20 Claims, 5 Drawing Sheets

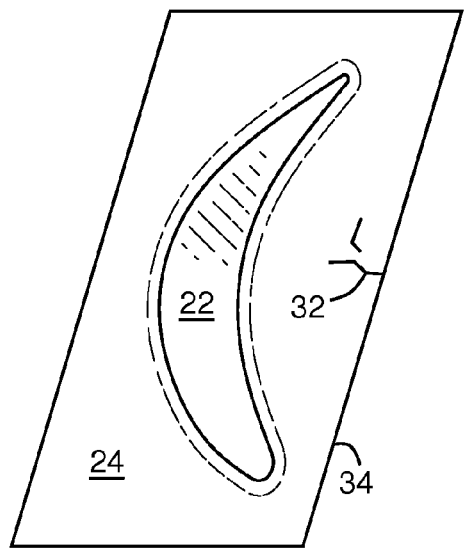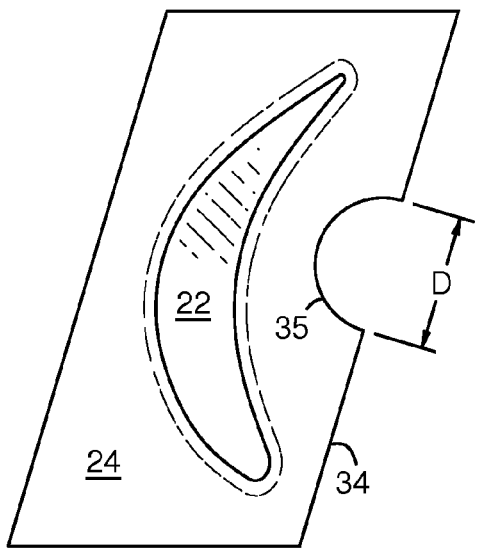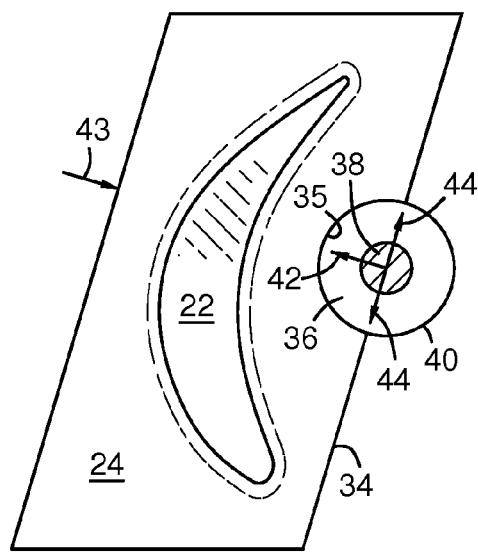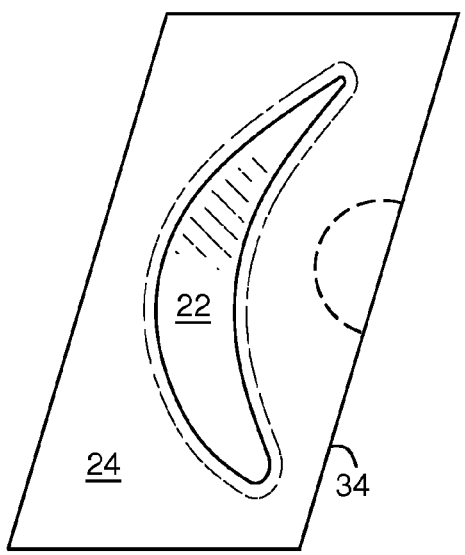

US 9,114,481 B1

INERTIA FRICTION DISK WELDING

FIELD OF THE INVENTION

The invention relates generally to inertia friction disk welding, and in one embodiment, to the repair and restoration of high-temperature superalloy gas turbine components

BACKGROUND OF THE INVENTION

Gas turbine blades are designed with platform structures that are subject to degradation from thermo-mechanical fatigue and resulting cracks. Cracking of such elements ranges from crazing (superficial or shallow cracks) to through-wall cracks The use of high-temperature superalloy metals in these structures increases the difficulty of repair, often requiring hotbox welding with a low yield of successful repairs Often degraded components are considered irreparable and must be scrapped A need exists to improve the success in repairing such components.

United States patent application publication number US 2012/0205014 A1 discusses prior art problems with inertia friction welding, including strain on the workpiece causing solidification stress. FIG. 2 of that application illustrates separation of the fusion interface from such stress. That application describes a stress relief regiment to address that problem. Further improvements in such technology are desired

BRIEF DESCRIPTION OF THE DRAWINGS

The invention is explained in the following description in view of the drawings that show.

FIG. 3 is a top view of a blade and a cracked platform.

FIG. 4 is a view as in FIG. 3 after removal of cracked area of platform

FIG. 5 is a view as in FIG. 3 during inertia welding with an additive disk

FIG. 6 is a view as in FIG. 3 after removal of excess disk and shaft

DETAILED DESCRIPTION OF THE INVENTION

Figure 1:
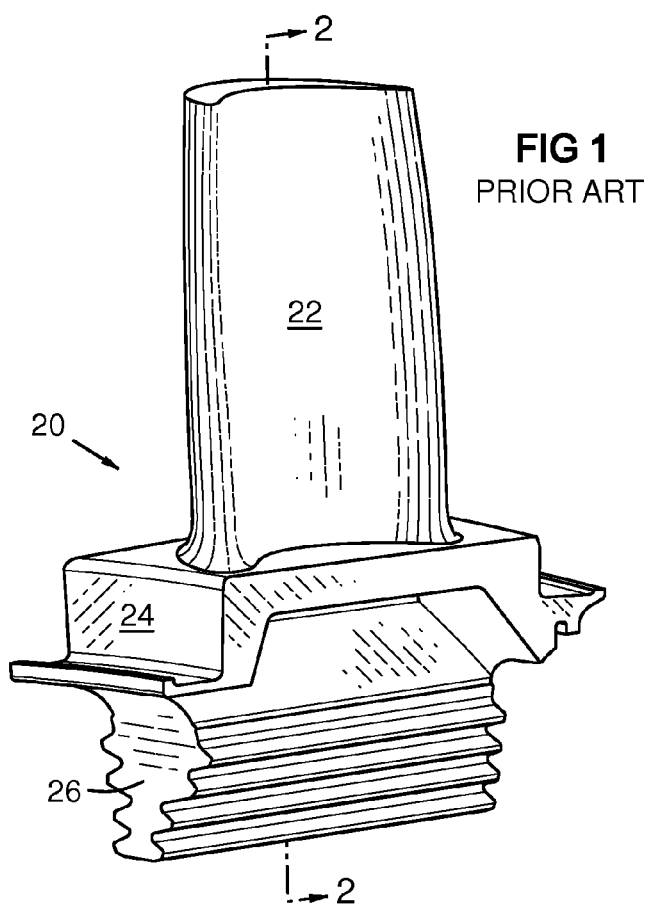
FIG. 1 is a perspective side/front view of a conventional gas turbine blade assembly
Figure 2:
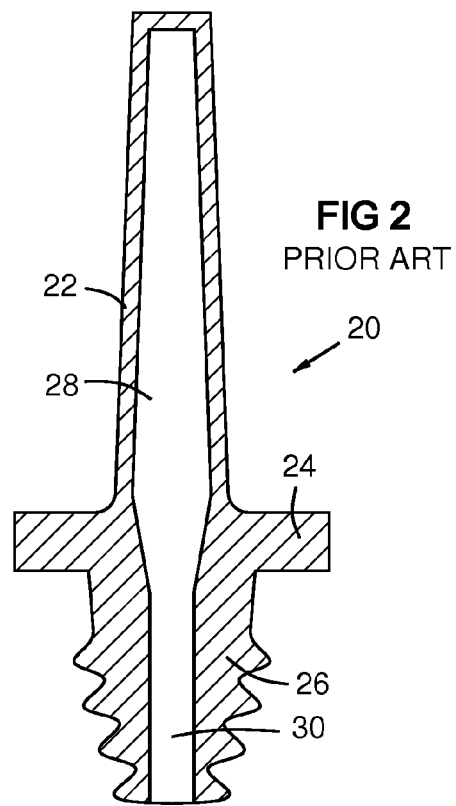
FIG. 2 is a front sectional view taken along line 2-2 of FIG. 1

FIGS. 1 and 2 illustrate a conventional gas turbine blade assembly 20, including a blade 22, a platform 24 and a root 26

The blade has a hollow airfoil sectional shape with cooling chambers 28 supplied by coolant flow channels 30 from the bottom of the root FIG. 3 is a top view of a blade 22 on a platform 24 having cracks 32 near a first edge 34 thereof, with the blade 22 staged for repair in accordance with an embodiment of the present invention The cracks may be surface cracks or through cracks FIG. 4 shows the platform after removal of cracks by milling or cutting from the edge 34 to form a cutout 35 In one embodiment, the cutout 35 may have a concave cylindrical surface with diameter D. However, other surfaces of rotation may be used, such a conical or spherical Milling with the side of a mechanical milling bit is suggested, but other cutting technologies may be used, such as water jet, plasma cutting, and laser cutting FIG. 5 shows an inertia welding disk 36 rotated by a shaft 38. The shaft may have a smaller diameter than the disk, but this is not a requirement The circumference 40 of the disk is pressed radially 42 into the cutout 35 as the disk rotates, creating frictional heat that plastically fuses the surface of the disk onto the surface of the cutout. An opposing force 43 is needed to oppose the inward force 42 of the disk into the cutout 35 The disk 40 may be made of the same material as the platform, although different materials may be fused in some embodiments Variations in pressure across the cutout surface are largely self-correcting as hot areas plasticize and relieve local pressure. This results in uniform heating and a consistent fusion interface. The disk cutout may have less depth than the disk radius. Alternately or additionally, the disk may be reciprocated radially laterally 44 against alternate sides of the cutout to normalize pressure over the extent of the cutout.

FIG. 6 shows a repaired platform after removal of excess disk and shaft material flush with the edges of the cutout and flush with the surfaces of the platform The remaining disk material, now fused with the platform, becomes an integral part of the platform, restoring it. The inventors have recognized that prior art friction welding with a rod end generates no rotary motion at the center of the rod end, so the weld receives no friction centrally, while the periphery of the weld receives maximum friction This contributes to a thermal gradient and solidification stress and possibly incomplete fusion at the center of the rod end. The present method lacks a frictionless center because the circumference of the disk has the same speed over the whole cutout surface (with a cylindrical disk) or has a non-zero speed within a desired range (spherical, conic, and other disk shapes).

Figure 7:
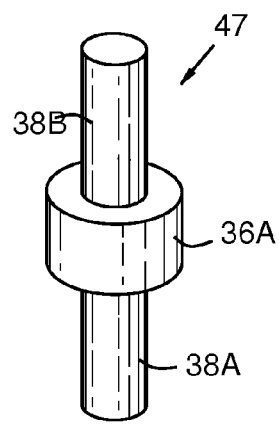
FIG. 7 is a perspective view of an additive cylindrical disk with dual shafts
Figure 8:
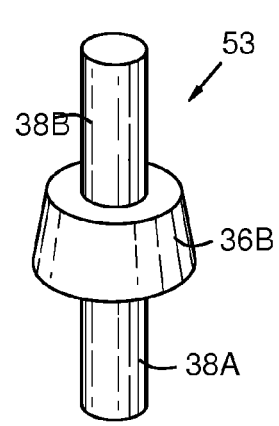
FIG. 8 is a perspective view of an additive conical disk with dual shafts.
Figure 9:
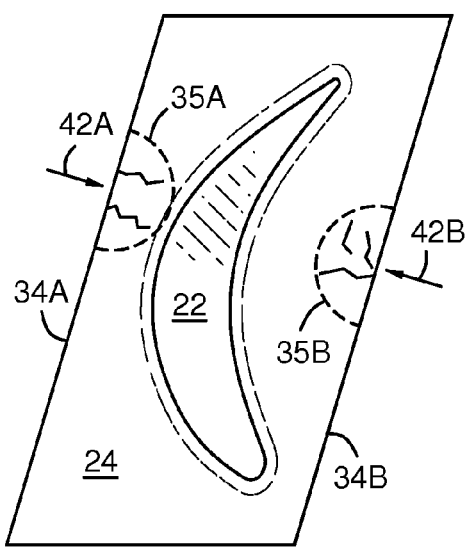
FIG. 9 is a top view of a turbine blade and platform planned for simultaneous repair on opposite edges of the platform with balanced disk forces

FIGS. 7 and 8 show examples of a cylindrical disk 36A and a conical disk 36B in disk/shaft assemblies 47, 53 A two-ended shaft 38A and 38B may extend from opposite ends of each disk. This allows the shaft to be supported by a drive chuck on one end and a bearing on the other end, making it a doubly supported beam, rather than a cantilever, which improves pressure control and reduces vibrations. However, a two-ended shaft is not a requirement The disk 36A, 36B may be formed integrally with the shaft or mounted thereon, for example by a nut and an opposed flange against opposite ends of the disk. The disk may be indexed to the shaft for example by flats on the shaft and disk FIG. 9 shows a platform 24 in which degradation is present on opposite edges 34A, 34B. Opposed cutouts 35A, 35B can be made, and two disks can be pressed into the cutouts from opposite directions 42A, 42B allowing the two opposed edges of the platform to be repaired at once with minimal fixturing because the disk pressure forces are balanced.

Figure 10:
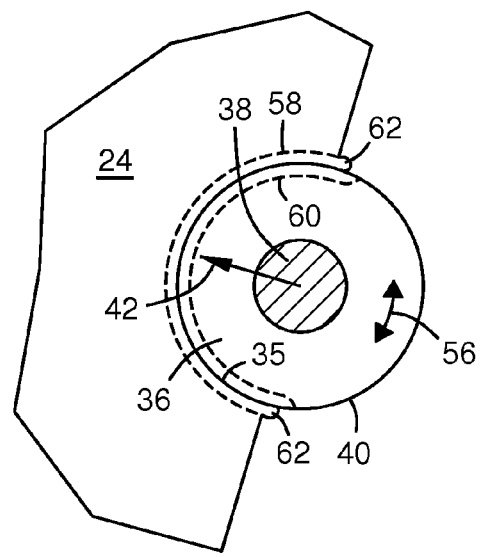
FIG. 10 is a top partial sectional view of an inertia friction repair in progress with rotary oscillation of the disk.
Figure 11:
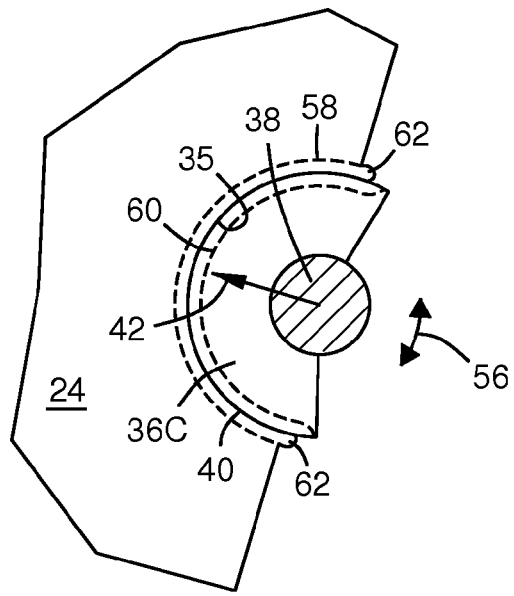
FIG. 11 is a view as in FIG. 10 using a partial disk to reduce excess metal to be trimmed.
Figure 12:
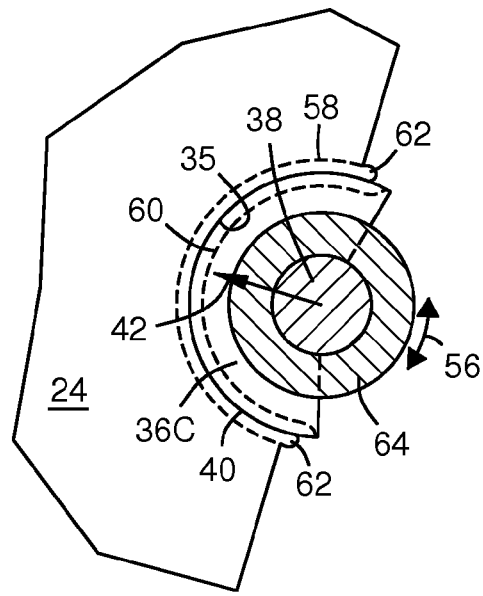
FIG. 12 is a view as in FIG. 11 showing a nut mounting a partial disk to a shaft.
Figure 13:
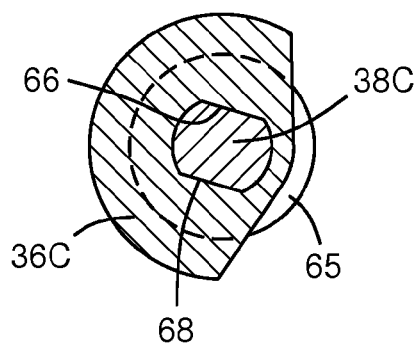
FIG. 13 is a top sectional view of a partial disk mounted on a shaft with flats indexing the disk to the shaft.

FIG. 10 shows a disk pressed radially 42 into cutout 35 in a platform 24. The disk is not rotating constantly, but uses rotary oscillation 56 to create the friction. This generates a plasticized interface 58, 60 between the respective surfaces of the cutout 35 and the disk 36 Using rotary oscillation avoids maintaining a plastic zone 60 around the whole disk circumference 40 subject to environmental cooling. It also avoids dragging extruded plasticized material of the platform around the disk. It also avoids creating a subduction trench at the inward-moving side of the disk. Rotary oscillation beneficially extrudes a small amount of material 62 from both sides of the interface. This provides material for flush trimming, and avoids a trench on either end. The rotary oscillation may be less than 20 degrees total, such as plus and minus 5 or 3 degrees, minimizing exposure of the heated zone 60 to the air during welding The oscillations may be rapid such as 10 to 50,000 cycles per second Rotary oscillation mechanisms are known, and are not detailed here FIG. 11 shows an embodiment of a disk 36C for rotary oscillation using a partial disk 36C with less than 360 degrees of circumference. Using a partial disk leaves less scrap metal to trim For example, the disk may have less than 220 degrees of circumference, or less than 180 or 150 degrees for shallower cutouts. FIG. 12 shows an embodiment as in FIG. 11 using mounting means such as a nut 64 and opposed flange (not visible) to fasten the disk 36C onto the shaft 38 FIG. 13 shows a partial disk 36C mounted on a shaft 38C against a shaft flange 65 The disk has internal flats 66 for indexing it to external flats 68 on the shaft 38C. Other attachment means may be used.

Figure 14:
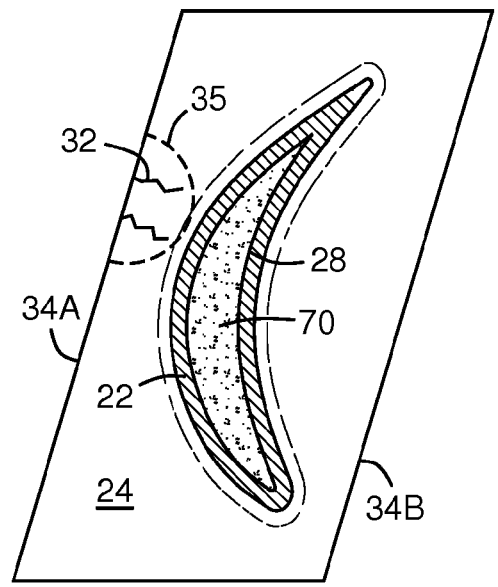
FIG. 14 is a top view of a platform with a hollow turbine blade in section with a supporting material in the blade chamber to reduce strain from disk pressure
Figure 15:
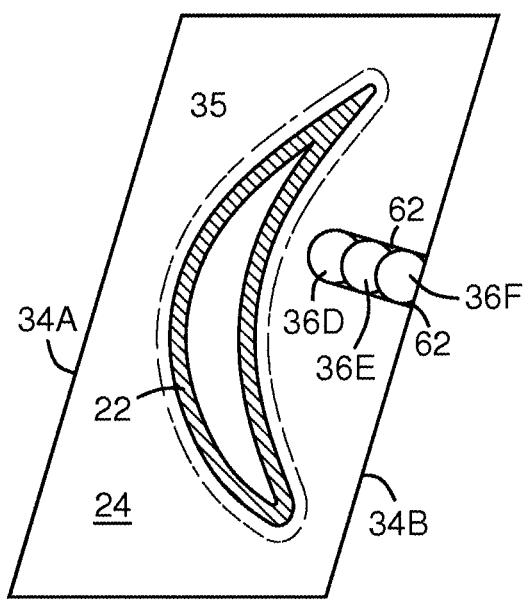
FIG. 15 is a top view of a platform with a turbine blade in section showing a deep, narrow repair using overlapping disk additions

FIG. 14 is a top sectional view of a hollow turbine blade 22 on a platform 24 Cracks extend from an edge 34A of the platform to close proximity with the blade. The cutout 35 may allow strain in the blade wall to deform the platform and blade under pressure by the disk In this situation the blade chamber 28 may be filled with sand or fluid 70 to internally support the wall of the blade and the adjoining reduced platform Alternately, incompressible fugitive cement may be inserted into the relevant chamber(s), and then removed by chemical means after the repair is complete An example of such a routinely fugitive cement is widely recognized as Great Stuff™ from Dow Chemical Company. That product expands to fill gaps but may be dissolved by certain solvents such as acetone FIG. 15 shows a deep narrow repair made with overlapping disk additions 36D, 36E, 36F After fusing the first disk 36D into a first cutout, a second cutout is formed into the first disk in order to receive the second disk 36E. The first disk 36D may be formed to have less than a circumference of 360 degrees such that the second cutout is at least partially preformed. This process may be repeated for disk 36F. Extrudate 62 from rotary oscillation fills the gaps in the cutouts between successive disks.

The present invention may have particular application to the repair of superalloy components such as gas turbine vanes and blades, but it is not necessarily limited to any particular type of material While various embodiments of the present invention have been shown and described herein, it will be obvious that such embodiments are provided by way of example only Numerous variations, changes and substitutions may be made without departing from the invention herein. Accordingly, it is intended that the invention be limited only by the spirit and scope of the appended claims.

The invention claimed is:

1. A method of friction welding comprising,
    forming a first cutout in a component, wherein the first cutout comprises a concave surface of rotation that is open radially to a first edge of the component,
    pressing a circumference of a first disk radially into and against the surface of rotation of the first cutout, wherein the circumference comprises a convex surface that mates with the concave surface of rotation of the first cutout, and
    rotating the first disk to create frictional heating that fuses the first disk to the component.

2. The method of claim 1, further comprising, after fusing the first disk, trimming scrap portions of the first disk away from the component.

3. The method of claim 1, wherein the rotating comprises a rotary oscillating of the first disk by alternately rotating it in opposite directions.

4. The method of claim 3, further comprising providing the first disk with less than 360 degrees of circumference.

5. The method of claim 1, further comprising reciprocating the first disk radially against alternating opposed sides of the first cutout to distribute a pressure of the rotating first disk uniformly across an angular extent of the first cutout.

6. The method of claim 1, further comprising forming a second cutout in a second edge of the component opposed the first edge, and pressing a second disk into the second cutout in a direction toward the first disk wherein respective pressing forces of the first and second disks counter each other.

7. The method of claim 1, further comprising inserting a removable material into a hollow portion of the component to support a shape of the component prior to the step of pressing.

8. The method of claim 1, further comprising,
    forming the first cutout deeper than a radius of the first disk;
    after fusing the first disk, forming a second cutout in the first disk;
    pressing a circumference of a second disk radially into and against the second cutout; and
    rotating the second disk to create a second frictional heating that fuses the second disk into the component.

9. The method of claim 1, further comprising forming the first disk and first cutout to have cooperating cylindrical surfaces.

10. The method of claim 1, further comprising forming the first disk and first cutout to have cooperating conical surfaces.

11. A method of friction welding comprising,
    forming a first cutout in a wall of a component, the wall comprising first and second opposed surfaces and a first edge there between, wherein the first cutout comprises a concave surface of up to 180 degrees in angular extent that is open to the first edge of the wall;
    pressing a circumference of a first disk radially into and against the surface of the cutout, wherein the circumference of the first disk comprises a convex surface that mates with the concave surface of the first cutout; and
    rotating the first disk to create a first frictional heating that fuses the first disk to the surface of the first cutout.

12. The method of claim 11, further comprising, after fusing the first disk, trimming scrap portions of the first disk flush with edges of the first cutout.

13. The method of claim 11 wherein the rotating comprises a rotary oscillating of the first disk by alternately rotating it in opposite directions.

14. The method of claim 13, further comprising providing the first disk with less than 360 degrees of circumference in order to reduce scrap metal to be trimmed therefrom.

15. The method of claim 11, further comprising reciprocating the first disk radially against alternating opposed sides of the first cutout to distribute a pressure of the rotating first disk uniformly across an angular extent of the first cutout.

16. The method of claim 11, further comprising forming a second cutout in a second edge of the component opposite the first edge, and pressing a second disk into the second cutout in a direction toward the first disk wherein respective pressing forces of the first and second disks oppose each other.

17. The method of claim 11, further comprising inserting a removable material into a hollow portion of the component to support a shape of the component in opposition to a strain caused by the pressing.

18. The method of claim 11, further comprising;
   forming the first cutout deeper than a circumference of the first disk;
   forming a second cutout in the first disk,
   pressing a circumference of second disk radially into and against the second cutout, and
   rotating the second disk to create a second frictional heating that fuses the second disk to the first disk.

19. The method of claim 11, further comprising forming the first disk and first cutout to have cooperating cylindrical surfaces.

20. The method of claim 11, further comprising forming the first disk and first cutout to have cooperating conical surfaces.

* * * * *